(12) United States Patent
Vidmar et al.

(10) Patent No.: US 6,520,704 B1
(45) Date of Patent: Feb. 18, 2003

(54) SYSTEM FOR MOUNTING AN OBJECT TO A SUPPORT

(75) Inventors: James F. Vidmar, Willoughby, OH (US); Peter D. Rimback, S. Euclid, OH (US)

(73) Assignee: Hanover Direct, Inc., Weehawken, NJ (US)

(*) Notice: Subject to any disclaimer, the term of this patent is extended or adjusted under 35 U.S.C. 154(b) by 0 days.

(21) Appl. No.: 09/769,991

(22) Filed: Jan. 25, 2001

Related U.S. Application Data

(63) Continuation-in-part of application No. 09/609,528, filed on Jul. 3, 2000, now abandoned.

(51) Int. Cl.[7] .............................. F16B 7/08; F16B 9/00
(52) U.S. Cl. .................. 403/188; 411/510; 411/388; 248/250; 403/279; 403/280
(58) Field of Search .................. 403/279, 280, 403/282, 188, 381; 411/508, 509, 510, 913, 89, 388; 248/250

(56) References Cited

U.S. PATENT DOCUMENTS

| | | | | |
|---|---|---|---|---|
| 3,205,757 A | * | 9/1965 | Kuennen | 411/923 |
| 3,333,555 A | | 8/1967 | Kapnek | 108/152 |
| 3,494,244 A | | 2/1970 | Wayland | 85/5 |
| 3,966,339 A | * | 6/1976 | Nemecek et al. | 403/292 |
| 4,234,094 A | | 11/1980 | Jorgensen | 211/88 |
| 4,454,699 A | | 6/1984 | Strobl | 52/585 |
| 5,150,865 A | * | 9/1992 | Miller | 248/71 |
| 5,326,061 A | | 7/1994 | Hamilton | 248/239 |
| 5,513,575 A | | 5/1996 | Slade | 108/42 |
| 5,551,817 A | * | 9/1996 | Kanie | 411/107 |
| 5,669,592 A | | 9/1997 | Kearful | 248/217.4 |
| 5,716,161 A | * | 2/1998 | Moore et al. | 403/406.1 |
| 5,772,551 A | * | 6/1998 | Mabie | 474/256 |
| 5,868,537 A | * | 2/1999 | Latal et al. | 411/418 |
| 5,907,891 A | * | 6/1999 | Meyer | 24/453 |
| 5,909,991 A | * | 6/1999 | Manion et al. | 411/377 |
| 5,934,729 A | * | 8/1999 | Baack | 296/39.1 |
| 5,992,654 A | | 11/1999 | Dente, Jr. | 211/90.01 |
| 6,305,892 B1 | * | 10/2001 | Qiao | 411/508 |

FOREIGN PATENT DOCUMENTS

GB  107517  7/1917

OTHER PUBLICATIONS

Shelf Master, Improvements Catalog No. 174654, Corner Shelves, May '99.
Internet Site www.As Seen On TV and more.com, Shelf Master, 8/00.
Catalog Sheet, common "Push Pin", Gem Office Products, 1997.

* cited by examiner

Primary Examiner—Anthony Knight
Assistant Examiner—John B. Walsh
(74) Attorney, Agent, or Firm—Thompson Hine LLP

(57) ABSTRACT

A system and method for mounting an object to a support utilizes a push-pin that is adapted to be pushed or screwed into the support (such as a wall), without necessitating the use of hammers, screwdrivers, drills, etc. The push-pin has a novel head that includes resilient "grippers" for providing a friction fit within a hole or channel of the object (such as a shelf) to be mounted to the support. In an exemplary embodiment, the grippers are a plurality of resilient annular rings sized to be slightly larger in diameter than the dimension of the mating hole or channel so that when the mating hole or channel of the object engages with the larger diameter rings, the rings are deformed slightly upon entering the hole or channel, thereby, providing a friction fit between the head of the pin and the object to be mounted to the support.

12 Claims, 5 Drawing Sheets

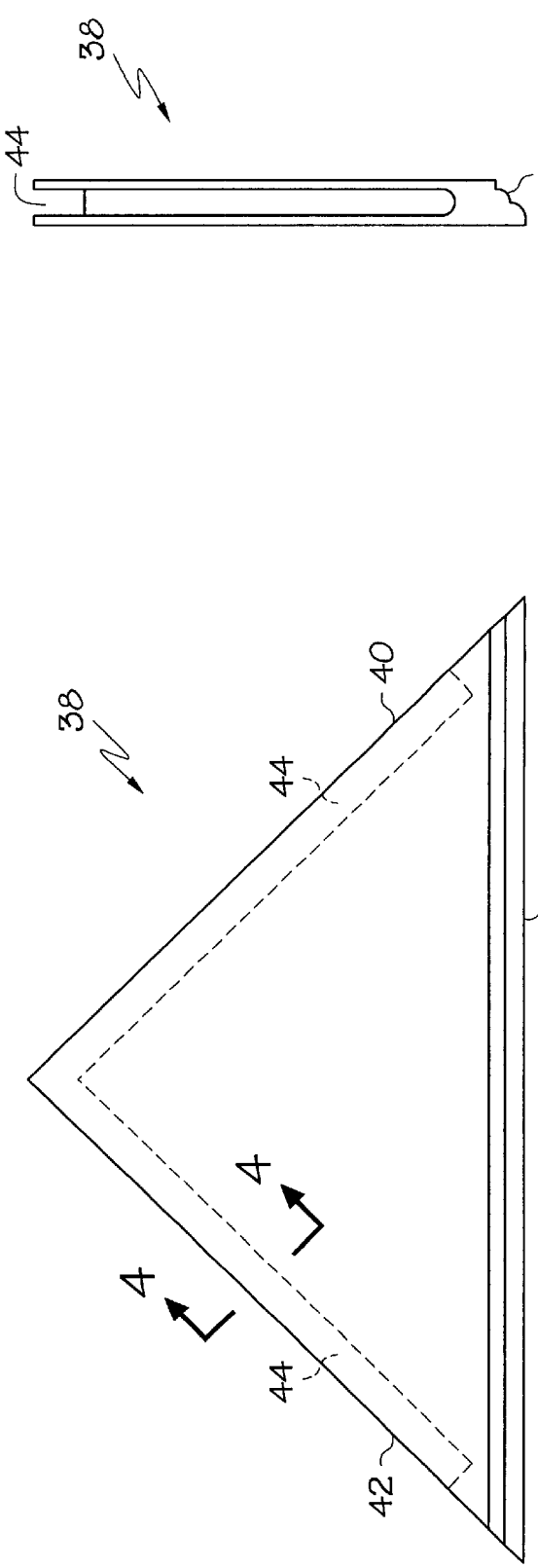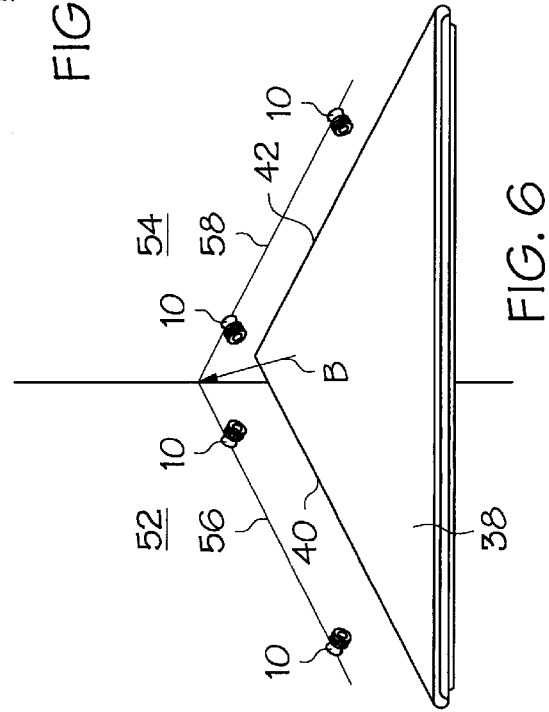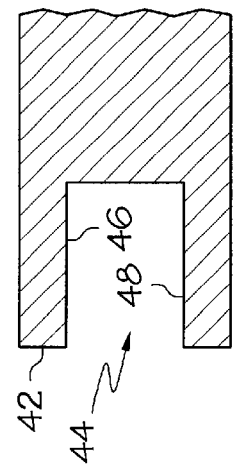
FIG. 5
FIG. 6
FIG. 3
FIG. 4

SYSTEM FOR MOUNTING AN OBJECT TO A SUPPORT

CROSS-REFERENCE TO RELATED APPLICATIONS

The present application is a continuation-in-part application from U.S. patent application Ser. No. 09/609,528, filed Jul. 3, 2000 now abandoned.

BACKGROUND

The present invention is directed to a system for mounting an object (such as a shelf) to a support (such as a wall); and more particularly, to such a mounting system that allows the object to be mounted to the support, by hand, without necessitating the use of any tools, such as hammers, screwdrivers, drills, etc.

SUMMARY

The system of the present invention utilizes an improved push-pin that is adapted to be pushed or screwed into a support (such as a wall), without necessitating the use of hammers, screwdrivers, drills, etc. The improved push-pin includes a novel head that includes resilient projections or "grippers" for providing a friction fit within a hole or channel of the object (such as a shelf) to be mounted to the support. In an exemplary embodiment, the grippers are a plurality of resilient annular rings sized to be slightly larger in diameter than the dimension of the mating hole or channel so that when the mating hole or channel of the object engages with the larger diameter rings, the rings are deformed slightly upon entering the hole or channel, thereby, providing a friction fit between the head of the pin and the object to be mounted to the support.

Preferably, the resilient "gripper" head of the push-pin is injection molded over the threaded shaft to provide a singular device, where the "gripper" head and push pin are fixedly coupled together. The push-pin of the present invention, therefore, combines the substantially permanent mounting capabilities of a screw or nail with the removable friction-fit mounting capabilities of the "gripper" head in such a singular device.

In addition, the resilient material of the "gripper" head combined with its ergonomic shape uniquely enables the push-pin of the present invention to be mounted to the vertical support (wall) by hand, without the use of tools. The ergonomic shape includes an indentation between the annular "gripper" rings and the shaft, allowing a user to comfortably and securely grip the "gripper" head by placing his or her thumb and index finger in the indentation. The grip also facilitates increased stability while the push-pin is being thrust into the support.

Of course, while the exemplary embodiment of the push pin has a substantially cylindrical head, it is within the scope of the invention that the head of the push pin could have an alternate shape, such as a rectangular shape. With this alternative shape, gripper projections will extend from the upper and lower vertical surfaces of the head to engage with the upper and lower walls of the mating hole or channel of the object.

It is thereby an aspect of the invention to provide a system for mounting an object to a support that comprises: (a) an object having a substantially flat surface and a hole or a channel extending into the substantially flat surface, where the hole or channel has upper and lower inner surfaces and a vertical distance between the upper and lower surfaces; and (b) at least one fastener. The fastener includes: (1) a head having a resilient projection extending therefrom, where the projection provides the head with a vertical width that is slightly greater than the vertical distance between the upper and lower vertical surfaces of the hole or channel extending into the substantially flat surface of the object, and (2) a shaft rigidly affixed to, and extending from the head, which is adapted to penetrate the support and securely attach the head to the support. Therefore, the object is mounted to the support by driving the shaft of the fastener into the support, so that the head is securely attached to the support, and by pressing the hole or channel extending into the substantially flat surface of the object against the exposed head of the fastener so that the resilient projection deforms to allow the head to pass into the hole or channel, providing a friction fit between the head and the hole or channel.

The shaft is preferably pointed and threaded so that the fastener can be either pushed or screwed by hand into the support by a user, preferably using his or her thumb and index finger. In one embodiment, the projection is an annular projection and the head includes a plurality of the annular projections distributed axially therealong. In another embodiment, the head includes at least two projections, a first one of the projections extending vertically upwardly and the second one of the projections extending vertically downwardly, providing a projection pair, where the head includes a plurality of the projection pairs distributed axially therealong.

It is also preferred that the system includes a plurality of the fasteners and the object includes a channel that is at least partially horizontal, extending into the substantially flat surface of the object, where the plurality of fasteners are adapted to be distributed along the channel.

It is another aspect of the present invention to provide a fastener for mounting an object (such as a shelf) to a support (such as a wall) that comprises a head rigidly affixed to a shaft, where the head includes a resilient projection extending therefrom. Preferably, the shaft is metal, pointed and threaded so that it can be driven into the support by a user applying pressure to the head by using his or her thumb and index finger. In a preferred embodiment of the fastener, the projection is an annular projection and the head includes a plurality of the annular projections distributed axially therealong. In another embodiment, the head includes at least two projections, first one of the projections extending vertically upwardly and the second one of the projections extending vertically downwardly, providing a projection pair, where the head includes a plurality of the projection pairs distributed axially along the head.

Yet another aspect of the present invention provides a method for mounting an object (such as a shelf) to a support (such as a wall) that comprises the steps of: (a) providing a hole or a channel in a substantially flat surface of the object; (b) providing at least one fastener including a head affixed onto a longitudinal end of a narrow shaft, where the head includes a resilient projection extending therefrom, and where the projection provides the head with a vertical width that is slightly greater than the vertical distance between the upper and lower vertical surfaces of the hole or channel extending into the substantially flat surface of the object; (c) securely attaching the head to a support by penetrating the shaft into the support; and (d) pressing the hole or channel extending into the substantially flat surface of the object against the head of the fastener so that the resilient projection deforms to allow the head to pass into the hole or channel, providing a friction fit between the head and the hole or channel. In one embodiment, the shaft is a threaded shaft and the penetrating step includes a step of turning the threaded shaft.

In another embodiment of the above method, the object is provided with a channel in its substantially flat surface, where the channel is at least partially horizontal. In this embodiment, the method includes the steps of: (i) providing a plurality of the fasteners; (ii) securely attaching the heads of the fasteners to the support; and (iii) pressing the channel extending into the substantially flat surface of the object against the plurality of heads of the fasteners so that their resilient projections deform, allowing the heads to pass into the channel and providing a friction fit between the plurality of heads and the channel.

Accordingly, it is an object of the present invention to provide a system and method for mounting an object (such as a shelf) to a support (such as a wall) that does not require the use of tools, such as hammers, screwdrivers, drills, etc. It is another object of the present invention to provide an improved push pin having a novel head which is adapted to mate with and provide an interference fit with a hole or channel extending into an object that is to be hung from or mounted to the push pin. Despite the above-stated objects and advantages of the present invention, it is to be understood that it is not necessary to meet any or all of the stated advantages or objects of the present invention disclosed herein in order to fall within the scope of any claims, since the invention is defined by the claims and since inherent and/or unforseen advantages of the present invention may exist even though they may not be explicitly discussed herein.

BRIEF DESCRIPTION OF THE DRAWINGS

FIG. 3 is a bottom view of a comer shelf for use with the fasteners according to a preferred embodiment of the present invention;

FIG. 4 is a cross-sectional view of the corner shelf, taken along lines 4—4 of FIG. 3;

FIG. 5 is a side view of the comer shelf of FIG. 3;

FIG. 6 illustrates a step of mounting the comer shelf of FIG. 3 to a plurality of the fasteners shown in FIG. 1, which are in turn mounted to a pair of walls meeting at a comer;

DETAILED DESCRIPTION

Figure 1:
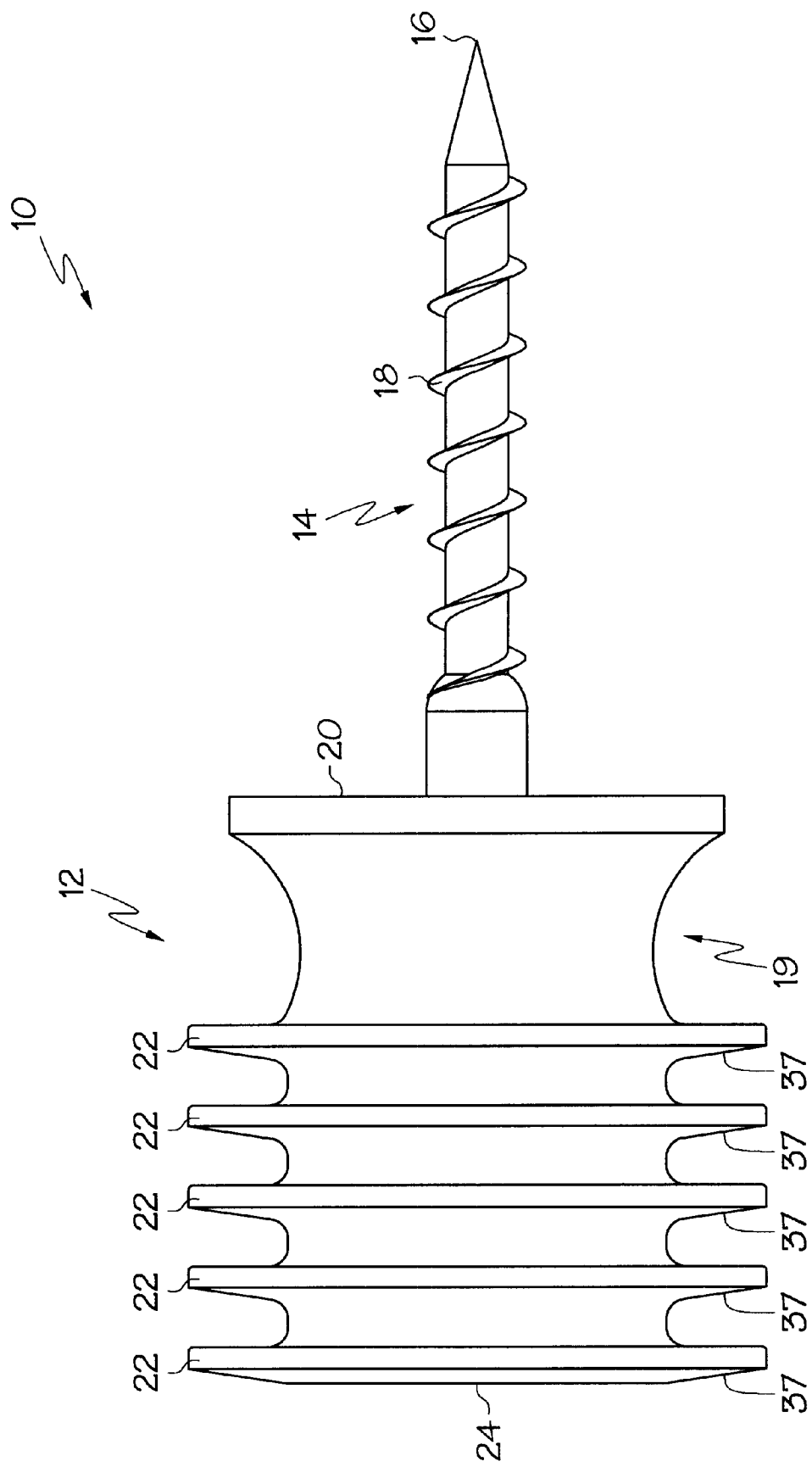
FIG. 1 provides an elevational side view of the fastener according to a preferred embodiment of the present invention.

As shown in FIG. 1, a fastener 10 according to a preferred embodiment of the present invention includes a substantially cylindrical head 12 and a shaft 14, coaxial with the substantially cylindrical head 12, and extending from a longitudinal end of the head 12. The head 12 is preferably formed from a resilient material that is preferably injection molded over the shaft 14. Of course, it is within the scope of the invention to securely affix the head 12 to the shaft 14 using other known expedients, such as adhesives or mechanical couplings.

The shaft 14 preferably has a pointed end 16 and a helical thread 18 provided thereon so that the fastener 10 can be threaded into a vertical support. The head 12 preferably includes an ergonomic gripping element in the form of an annular indentation 19 approximate the shaft, allowing a user to comfortably and securely grip the head 12 by placing his or her thumb and index finger in the indentation 19. The resilient material of the head 12 combined with its ergonomic shape uniquely enables the fastener 10 of the present invention to be gripped and driven into a vertical support (wall) by hand, without the use of tools. The grip also facilitates increased stability while the push-pin is being thrust into the support. While the use of the threads 18 is not necessary, the threads 18 will make it easier for the fastener 10 to be driven into the vertical support by the user (manually twisting the fastener) and will also provide additional surface area to retain the fastener 10 in the vertical support once installed.

The head 12 also includes a substantially flat longitudinal end surface 20 adapted to abut a flat surface of a wall or a vertical support and includes a plurality of resilient, annular projections 22 axially distributed therealong from the opposite longitudinal end 24 of the head.

Figure 2:
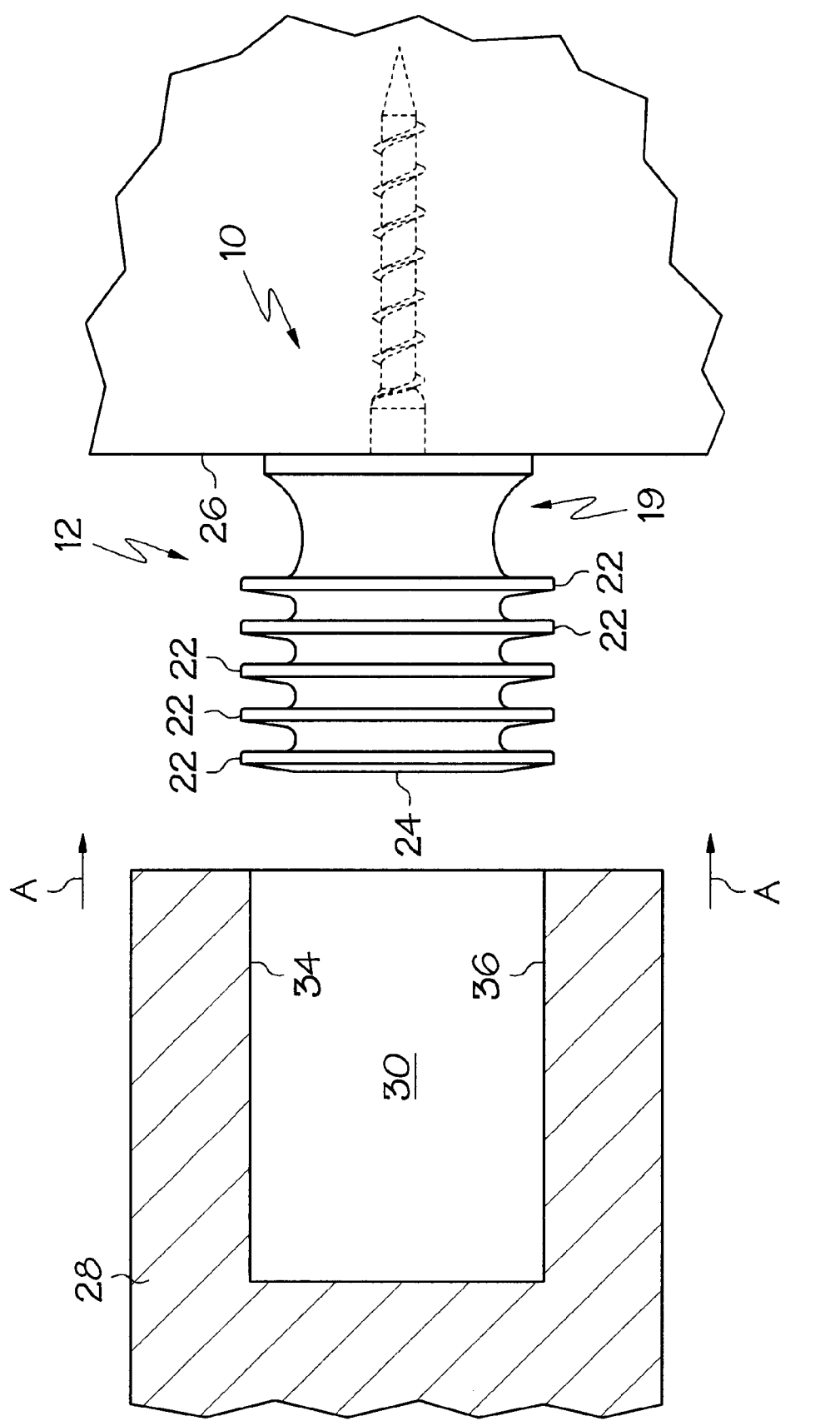
FIG. 2 illustrates a step of mounting an object to a fastener, which is, in turn, mounted to a vertical support.

As shown in FIG. 2, once the fastener 10 has been driven into a support 26 the annular projections 22 are provided to mount an object 28 to the support 26. The object 28 includes a hole or channel 30 extending into a substantially flat end surface 32 thereof, where the hole or channel 30 includes upper and lower walls 34, 36 and where the distance between the upper and lower walls 34, 36 is slightly less than the diameter of the projections 22 of the fastener such than when the hole or channel 30 of the object 28 is pressed against the head 12 of the fastener, 10 as shown by arrows A, the resilient projections 22 will deform somewhat allowing the head 12 to be received within the hole or channel 30. When the head 12 is received within the hole or channel 30, the resilient projections 22 provide a friction fit between the head 12 and the walls 34, 36 of the hole or channel 30, thereby facilitating in mounting the object 28 to the support 26. Referring back to FIG. 1, the circumferential leading edges 37 of the annular projections 22 are preferably tapered to facilitate easy insertion of the head 12 into the hole or channel 30.

Because of the unique design of the head 12, the object 28 may be easily mounted to the support 26, without necessitating the use of hand tools, such as hammers, screwdrivers, drills, etc. Of course, one may use such hand tools and still fall within the scope of the invention as defined herein. The friction fit between the head 12 and the object 28 also facilitates removal of the object 28 from the support 26 without necessitating the use of any hand tools since the friction fit provided by the head does not necessarily "lock" the object 28 to the fastener 10. Referring again to FIG. 2, the longitudinal end surface 20 of the fastener abutting the support 26 assures uniform distance from the surface of support 26 to the opposite longitudinal end 24 of the fastener; and when the flat longitudinal end surface 20 hits the flat surface of the support 26 as the user is manually pushing the fastener into the support, the user will be assured that the fastener is successfully and securely installed.

In an exemplary embodiment of the fastener 10, the head 12 is molded from a resilient plastic material such as Nylon 66; the diameters of the annular projections are approximately 12 mm; the axial length of the head is approximately 12 mm; and the shaft 14 is heat treated #1022 carbon steel and extends approximately 15 mm from the longitudinal end 20 of the head. Of course, those of ordinary skill in the art will recognize that other suitable materials and dimensions for the fastener may be used, while still falling within the scope of the invention as defined herein. With such an exemplary embodiment, a hole or channel 30 will be approximately 15 mm deep and have a spacing of approximately 10 to approximately 11 mm between the upper and lower walls 34, 36. Again, other suitable dimensions will be recognized by those of ordinary skill in the art, while still falling within the scope of the invention defined herein.

As shown in FIGS. 3–5, an example object to be mounted to a vertical support according to a preferred embodiment of the present invention is a corner shelf 38. The corner shelf 38 is a triangular shaped, planar board having a pair of substantially flat side edges 40, 42 meeting at a 90° angle. Milled within each of these edges 40, 42 is a substantially rectangular (in cross-section) channel 44, providing an upper wall 46 and a lower wall 48 within the channel 44. The remaining edge 50 of the triangular board may include beveled surfaces for decorative purposes.

As shown in FIG. 6, the corner shelf 38 may be mounted to a corner formed by two adjoining walls 52, 54 according to the following steps. First, a straight edge is held against a first one of the walls 52 at a desired height and a light pencil line 56 is drawn along the top of the straight edge. This step is repeated for the other wall 54 to provide line 58. Next, at least two of the fasteners 10 are driven into each wall 52, 54 along the pencil lines 56, 58. Preferably, one of the fasteners should be two inches out from the corner and the other should be 1 inch in from the end of the corner shelf's mounting slot 44. The remaining step is to push the corner shelf 38 against the exposed heads of the fasteners 10 as shown by arrow B in FIG. 6, such that the mounting slot 44 is pressed against each of the exposed heads of the fasteners 10 and such that the projections on each of the exposed heads of the fasteners 10 deform to allow the heads to be received within the slot 44, thereby providing a friction fit between the exposed heads of the fasteners 10 and the slot 44. This friction fit securely mounts the corner shelf 38 to the corner formed by the two walls, 52, 54.

The fasteners 10 provide a friction fit with the corner shelf 38 to prevent the shelf from easily pulling away from the walls, 52, 54, while also providing a load bearing capability, so that the corner shelf 38 may bear a substantial surface load (the shelf 38 of the exemplary embodiment is rated at 25 lbs.). It will be apparent to those of ordinary skill in the art that the use of more fasteners 10 will allow the corner shelf 38 to bear an even greater load. The annular projections 22 of the fasteners 10 provide a sufficient amount of axial surface area for the friction fit between the fasteners 10 and the slot 44 where it is not necessary for the angle between the two walls 52, 54 to be absolutely square (one will realize that many corners in homes or offices are not absolutely square when using the exemplary embodiment).

Figure 7:
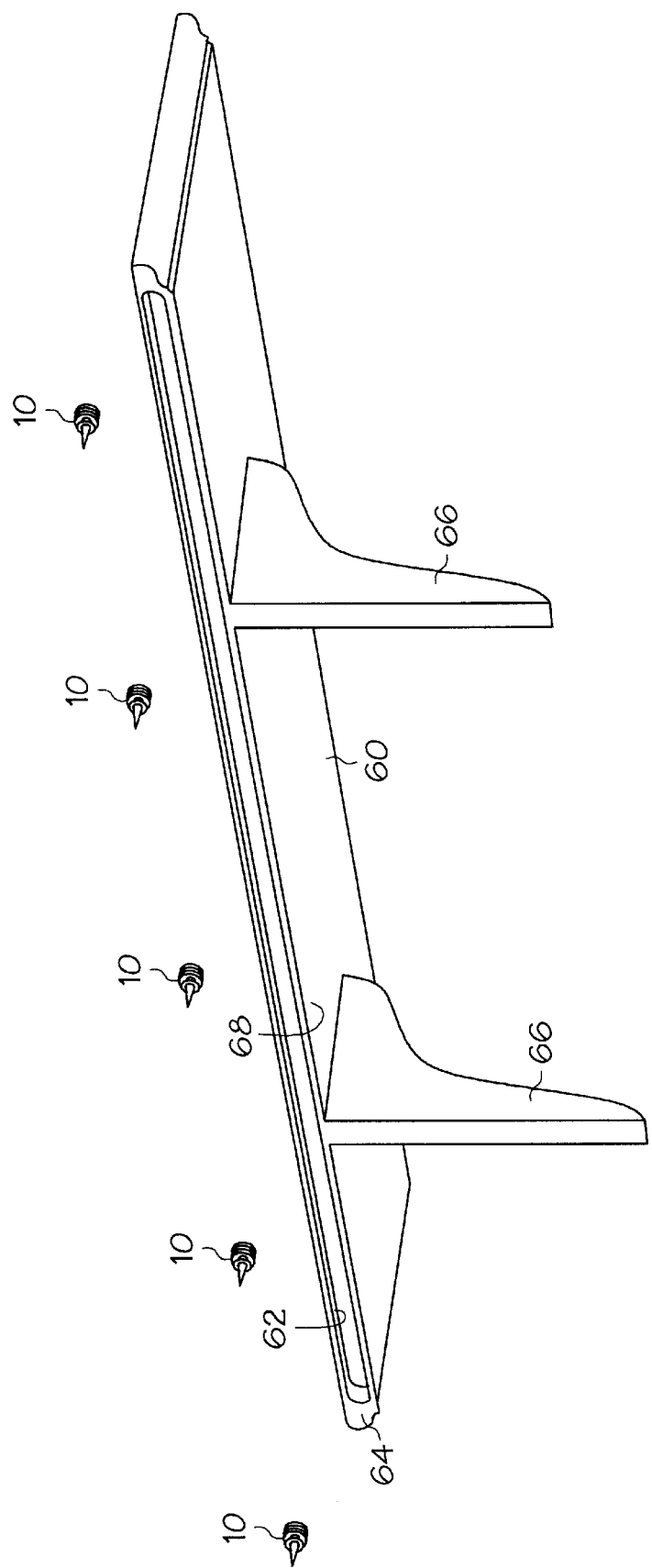
FIG. 7 illustrates another type of shelf that could be used with the fasteners of the preferred embodiment.

As shown in FIG. 7, an alternate object for mounting to a vertical support is a straight shelf 60 having a horizontal channel 62 milled into the substantially flat longitudinal end surface 64 of the shelf. This channel 62 is adapted to receive a plurality of the fasteners 10 previously secured into a vertical support. The fasteners 10 provide a friction fit within the channel 62, thereby securely mounting the shelf 60 to the vertical support. In this embodiment, the shelf also includes a pair of brackets 66 extending downward from a lower surface 68 of the shelf, where the brackets 66 are adapted to abut the vertical support when the shelf is mounted to the vertical support using the fasteners 10, thereby preventing the shelf 60 from pivoting downward on the fasteners 10.

The above two shelves 38, 60 are merely examples of objects that can be mounted to a vertical support using the fasteners 10. It will be apparent to those of ordinary skill in the art that the fasteners of the present invention may also be used to mount other types of objects to other types of supports (even horizontal supports such as ceilings), while still falling within the scope of the present invention. For example, the system of the present invention may be obviously adapted to mount picture frames, towel hooks, wall accessories, and decorations.

Figure 8:
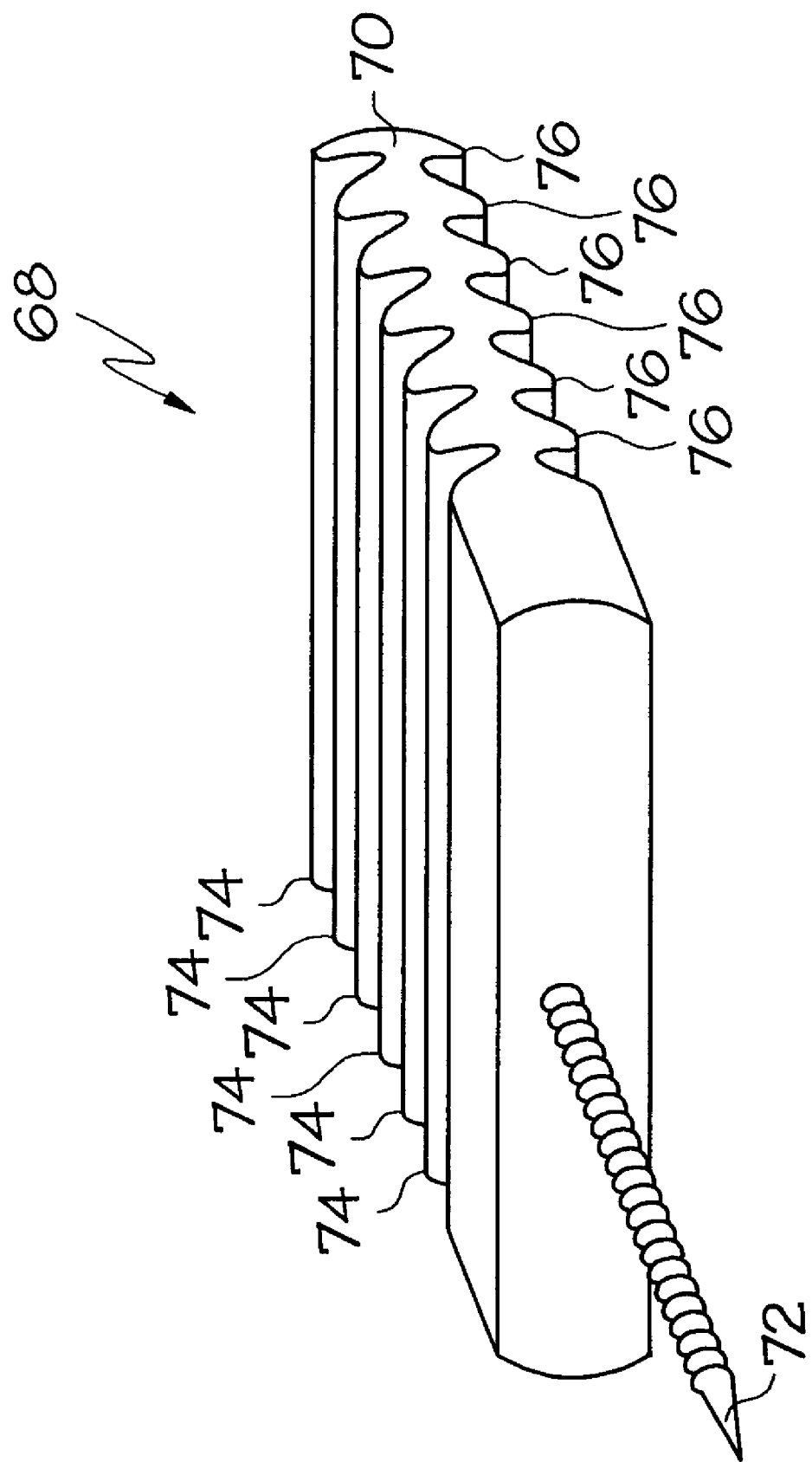
FIG. 8 provides a perspective view of a fastener according to an alternate embodiment of the present invention.

It is not necessary for the head of the fastener to be cylindrical. As shown in FIG. 8, one alternate embodiment of the fastener 68 includes a head 70 that is substantially rectangular in cross-section and a threaded shaft 72 affixed to, and extending from the geometric center of the rectangle. The head 70 includes a plurality of rib projections 74 extending from an upper surface thereof and another plurality of rib projections 76 extending from a lower surface thereof (although it is within the scope of the invention to provide only one of such projections extending from either the upper or lower surface of the head). The vertical height of the head 70 provided by the projections 74, 76 is slightly greater than the vertical distance between the upper and lower walls 34, 36 of the channel (FIG. 2), thereby providing a friction fit when the channel 30 is pressed over the head 70 of the fastener. This head 70 would provide more gripping area than the head 12 of FIG. 1, but may make mounting of the object to the support slightly more difficult since the head 70 would have to be horizontally aligned with the channel extending into the object. The head may include indentations (not shown in this embodiment) respectively extending into the upper and lower surfaces of the head that provide ergonimic gripping areas on the head 70 to facilitate secure and comfortable gripping of the head 70 between a user's thumb and index finger (each of which are maintained within one of the indentations).

While the apparatuses and processes herein described in the above description and summaries constitute exemplary embodiments of the present invention, it is to be understood that the invention is not limited to these precise apparatuses and processes, and that changes may be made therein without departing from the scope of the invention as defined by the claims. Additionally, it is to be understood that the invention is defined by the claims and it is not intended that any limitations or elements describing the exemplary embodiments herein are to be incorporated into the meaning of the claims unless such limitations or elements are specifically listed in the claims.

What is claimed is:

1. A system for mounting an object to a planar support comprising:

an object having a substantially flat surface and one of a hole or a channel extending through the substantially flat surface, the hole or channel having upper and lower inner surfaces and a vertical distance between the upper and lower vertical surfaces; and at least one fastener, the fastener including, a head having a resilient, annular projection extending therefrom, the projection providing the head with a vertical width that is slightly greater than the vertical distance between the upper and lower vertical surfaces of the hole or channel extending into the substantially flat surface of the object, and a metallic cylindrical shaft having a substantially smaller diameter than the head molded into and extending from the head, the shaft being adapted to extend into the planar support and securely attach the head to the planar support;

whereby, the object is mounted to the planar support by extending the shaft of the fastener into the planar support, thereby securely attaching the head to the planar support, and by pressing the hole or channel extending into the substantially flat surface of the object against the head of the fastener so that the resilient projection deforms to allow the head to pass into the hole or channel and providing a friction fit between the head and the hole or channel thereby holding the object in a flush engagement against the planar support;

wherein the head includes at least one indentation positioned axially between the projection and an end of the head from which the shaft extends, the indentation providing an ergonomic gripping element to facilitate a user gripper the fastener and manually inserting the shaft of the fastener into the support; wherein the head is substantially cylindrical, the projection is an annular projection and the indentation is an annular indentation.

2. The system of claim 1, wherein the shaft is a pointed shaft.

3. The system of claim 2, wherein the shaft is a threaded shaft.

4. The system of claim 1, wherein the head includes at least two projections, a first one of the projections extending vertically upwardly and a second one of the projections extending vertically downwardly.

5. The system of claim 4, wherein the first and second projections are axially aligned to provide a projection pair.

6. The system of claim 5, wherein the head includes a plurality of the projection pairs distributed axially along the head.

7. The system of claim 1, comprising a plurality of the fasteners.

8. The system of claim 7, wherein the object includes a channel that is at least partially horizontal, extending into the substantially flat surface, wherein the plurality of fasteners are adapted to be distributed along the channel.

9. The system of claim 8, wherein the object is a shelf.

10. The system of claim 9, wherein the shelf includes at least one bracket extending downward from a lower surface thereof, adapted to abut against the support and to prevent the shelf from pivoting downward on the fasteners when the fasteners are secured to the support and the heads of the fasteners are received within the channel of the shelf.

11. A fastener for mounting an object to a planar support comprising:

a metallic rigid shaft having a pointed leading end; and a substantially cylindrical head of resilient material molded onto a trailing end of the shaft having a diameter substantially larger than the shaft, the head including an annular indentation approximate a leading end of the head and a plurality of projections extending generally circumferentially thereabout and distributed generally uniformly along a portion of the head extending axially between the annular indentation and a trailing end of the head whereby the head is shaped such that the fastener affixes the object in a flush engagement against the planar support.

12. A fastener for mounting an object to a planar support comprising:

a metallic rigid shaft having a pointed leading end; and a head of resilient material molded onto a trailing end of the shaft having a diameter substantially larger than the shaft, the head having an upper surface and a lower surface and including a pair of indentations extending respectively into the upper and lower surfaces, approximate a leading end of the head, and including a first plurality of projections extending from the upper surface of the head and distributed generally uniformly along a portion of the head extending longitudinally between the indentations and a trailing end of the head, and including a second plurality of projections extending from the lower surface of the head and distributed generally uniformly along a portion of the head extending longitudinally between the indentations and a trailing end of the head whereby the head is shaped such that the fastener affixes the object in a flush engagement against the planar support.

* * * * *